(12) United States Patent
Wan et al.

(10) Patent No.: US 10,270,286 B2
(45) Date of Patent: Apr. 23, 2019

(54) LED SMART CONTROL CIRCUIT AND LED LIGHTING DEVICE CONTAINING THE SAME

(71) Applicant: ZHEJIANG SHENGHUI LIGHTING CO., LTD, Jiaxing (CN)

(72) Inventors: Yehua Wan, Jiaxing (CN); Lifeng Ling, Jiaxing (CN); Songan Ye, Jiaxing (CN)

(73) Assignee: ZHEJIANG SHENGHUI LIGHTING CO., LTD, Jiaxing (CN)

( * ) Notice: Subject to any disclaimer, the term of this patent is extended or adjusted under 35 U.S.C. 154(b) by 298 days.

(21) Appl. No.: 15/325,600

(22) PCT Filed: Jul. 11, 2016

(86) PCT No.: PCT/CN2016/089589
§ 371 (c)(1),
(2) Date: Jan. 11, 2017

(87) PCT Pub. No.: WO2017/071301
PCT Pub. Date: May 4, 2017

(65) Prior Publication Data
US 2017/0310160 A1    Oct. 26, 2017

(30) Foreign Application Priority Data

Oct. 27, 2015 (CN) .......................... 2015 1 0706767

(51) Int. Cl.
*H02J 9/06* (2006.01)
*F21V 3/06* (2018.01)
(Continued)

(52) U.S. Cl.
CPC .............. *H02J 9/065* (2013.01); *F21K 9/232* (2016.08); *F21K 9/235* (2016.08); *F21K 9/238* (2016.08);
(Continued)

(58) Field of Classification Search
CPC .......... H02J 9/065; F21V 29/70; F21K 9/238; F21K 9/232
(Continued)

(56) References Cited

U.S. PATENT DOCUMENTS 4,323,820 A    4/1982 Teich
4,703,191 A    10/1987 Ferguson
(Continued)

FOREIGN PATENT DOCUMENTS

CN    2814876 Y    9/2006
CN    103511960 A    1/2014
(Continued)

OTHER PUBLICATIONS

The World Intellectual Property Organization (WIPO) International Search Report for PCT/CN2016/089589 dated Jul. 11, 2016 p. 1-12.

*Primary Examiner* — Daniel Kessie
*Assistant Examiner* — Swarna N Chowdhuri
(74) *Attorney, Agent, or Firm* — Anova Law Group, PLLC

(57) ABSTRACT

A light-emitting diode (LED) smart control circuit and the related LED lighting device are provided. The LED smart control circuit includes a microprocessor, a bridge rectifier, a transformer circuit, a power grid detection unit, a voltage detection unit, a battery charging controller, a first sampling circuit, a second sampling circuit, a constant current controller, and an external rechargeable battery. The LED smart control circuit is configured for controlling LED light source components to emit light. An LED lighting device includes the LED light source components, a smart control circuit board, a rechargeable battery, a shell, and a lamp head. The smart control circuit board is integrated with the disclosed LED smart control circuit.

12 Claims, 5 Drawing Sheets

(51) Int. Cl.
| | |
|---|---|
| *H05B 33/08* | (2006.01) |
| *F21V 29/70* | (2015.01) |
| *F21K 9/238* | (2016.01) |
| *F21K 9/232* | (2016.01) |
| *F21S 9/02* | (2006.01) |
| *H02J 7/00* | (2006.01) |
| *F21V 23/00* | (2015.01) |
| *F21K 9/235* | (2016.01) |
| *F21Y 115/10* | (2016.01) |

(52) U.S. Cl.
CPC ................ *F21S 9/02* (2013.01); *F21V 3/062* (2018.02); *F21V 23/003* (2013.01); *F21V 29/70* (2015.01); *H02J 7/0068* (2013.01); *H05B 33/0803* (2013.01); *H05B 33/0815* (2013.01); *F21S 9/022* (2013.01); *F21Y 2115/10* (2016.08); *Y02B 20/347* (2013.01); *Y02B 20/348* (2013.01); *Y02B 20/383* (2013.01)

(58) Field of Classification Search
USPC .......................................................... 307/22
See application file for complete search history.

(56) References Cited

U.S. PATENT DOCUMENTS

| | | | |
|---|---|---|---|
| 5,365,145 A | 11/1994 | Fields | |
| 5,473,517 A | 12/1995 | Blackman | |
| 5,638,245 A | 6/1997 | Kim | |
| 5,646,486 A | 7/1997 | Edwards et al. | |
| 5,859,768 A | 1/1999 | Hall et al. | |
| 6,107,744 A | 8/2000 | Bavaro et al. | |
| 6,229,681 B1 | 5/2001 | Lee | |
| 6,502,044 B1 | 12/2002 | Lane et al. | |
| 6,900,595 B2 | 5/2005 | Cojocary | |
| 7,057,351 B2 | 6/2006 | Kuo | |
| 8,203,445 B2 | 6/2012 | Recker et al. | |
| 8,415,901 B2 | 4/2013 | Recker et al. | |
| 8,907,523 B2 | 12/2014 | Suhura et al. | |
| 10,153,702 B2 * | 12/2018 | Teo ................ | H02M 3/33523 |
| 2004/0062055 A1 | 4/2004 | Rozenberg et al. | |
| 2004/0100208 A1 | 5/2004 | Readio et al. | |
| 2005/0157482 A1 | 7/2005 | Hsu | |
| 2007/0086128 A1 | 4/2007 | Lane et al. | |
| 2007/0247840 A1 | 10/2007 | Ham | |
| 2008/0024010 A1 | 1/2008 | Romano | |
| 2009/0059603 A1 | 3/2009 | Recker et al. | |
| 2014/0063865 A1* | 3/2014 | Nate ................ | H02M 3/33507 363/21.13 |
| 2016/0036340 A1* | 2/2016 | Kikuchi .................. | H02M 1/32 363/21.14 |
| 2016/0072399 A1* | 3/2016 | Kikuchi ............ | H02M 3/33592 363/21.14 |
| 2016/0347213 A1* | 12/2016 | Pretta ........................ | F21K 9/23 |
| 2018/0123485 A1* | 5/2018 | Rastegar ................ | H02N 2/181 |
| 2018/0220506 A1* | 8/2018 | Sadwick ................ | F21S 2/00 |

FOREIGN PATENT DOCUMENTS

| | | |
|---|---|---|
| CN | 203523100 U | 4/2014 |
| CN | 105323923 A | 2/2016 |
| CN | 205213096 U | 5/2016 |
| EP | 2058922 A1 | 5/2009 |
| GB | 0704978 | 4/2007 |
| WO | 2006064209 A1 | 6/2006 |

* cited by examiner

LED SMART CONTROL CIRCUIT AND LED LIGHTING DEVICE CONTAINING THE SAME

CROSS-REFERENCES TO RELATED APPLICATIONS

This application is a national phase entry ender 35 U.S.C. 371(c) of PCT application No. PCT/CN2016/089589, filed on Jul. 11, 2016, which claims the priority of Chinese Patent Application No. 201510706767.0, filed on Oct. 27, 2015. The above enumerated patent applications are incorporated by reference herein in their entirety.

FIELD OF THE DISCLOSURE

The present disclosure relates to the field of light emitting diode (LED) technologies, and more particularly, relates to a smart light-emitting diode (LED) control circuit and an LED lighting device.

BACKGROUND

An LED is a solid semiconductor device capable of converting electric energy to visible light. LED lighting devices are considered energy-saving, environmentally friendly, and light controllable. The LED lighting devices may have high practicability, high stability, short response time, and long service time. LED lighting devices have been widely used in various lighting applications in accordance with a low-carbon life style.

External power grids are often used to provide electricity to LED lighting devices for emitting light. When external power grids malfunction or have power outages, the LED lighting devices will not work and would not be able to provide lighting for users. Users would have to use flashlights or other lighting devices for temporary lighting.

However, other lighting devices for emergency use do not have ideal lighting performances and require a manual operation, which may be time consuming and may cause inconvenience. Unpredictable risks may occur. In addition, when LED lighting devices are operating properly, the temporary lighting device for emergency conditions are not in use. Resources may be wasted.

The disclosed circuit and device are directed to solve one or more problems set forth above and other problems.

BRIEF SUMMARY OF THE DISCLOSURE

One aspect or embodiment of the present disclosure includes a light-emitting diode (LED) smart control circuit for controlling LED light source components to emit light. The light-emitting diode (LED) smart control circuit includes a microprocessor, a bridge rectifier, a transformer circuit, a power grid detection unit, a voltage detection unit, a battery charging controller, a first sampling circuit, a second sampling circuit, a constant current controller, and an external rechargeable battery. An input terminal of the LED smart control circuit is connected to an external power supply through a control switch. The microprocessor is connected to each of a voltage-dividing point of the first sampling circuit, a control terminal of the battery charging controller, an output terminal of the voltage detection unit, and an output terminal of the power grid detection unit. A power supply input terminal of the battery charging controller is connected to an output terminal of the transformer circuit, and an output terminal of the battery charging controller is connected to a first terminal of the first sampling circuit at a second connection point, the second connection point connecting with the external rechargeable battery. An input terminal of the voltage detection unit is connected to each of a voltage-dividing point of the second sampling circuit, a first terminal of the second sampling circuit is connected to an anode of the bridge rectifier, and a second terminal of the second sampling circuit is connected to a cathode of the bridge rectifier. The power grid detection unit is connected to the input terminal of the LED smart control circuit. An input terminal of the constant current controller is connected to an output terminal of the transformer circuit. The output terminal and a current detection terminal of the constant current controller are connected to the LED light source components.

Optionally, the first sampling circuit is configured to sample a voltage of the external rechargeable battery, and the microprocessor is configured to determine if the external rechargeable battery is fully charged based on the voltage of the external rechargeable battery. If the microprocessor determines the external rechargeable battery is not fully charged, the microprocessor controls the battery charging controller to charge the external rechargeable battery. The second sampling circuit is configured to sample a first signal rectified by the bridge rectifier, the voltage detection unit is configured to process the first signal to obtain a second signal, and the microprocessor is configured to determine if a voltage is inputted into the LED smart control circuit based on the second signal when the control switch is closed. If the microprocessor determines a voltage is inputted into the LED smart control circuit, the microprocessor controls the external power supply to provide power for the LED light source components. If the microprocessor determines no voltage is inputted into the LED smart control circuit, the microprocessor confirms the LED smart control circuit is connected to the external power supply through an impedance change signal detected by the power grid detection unit and controls the external rechargeable battery to provide power for the LED light source components.

Optionally, the first sampling circuit includes a first resistor and a second resistor connected in series, a first terminal of the first resistor being connected to the output terminal of the battery charging controller, a second terminal of the first resistor being connected to the a terminal of the second resistor at a first connection point, another terminal of the second resistor being grounded, and the first connection point and a voltage-dividing point of the first sampling circuit being a same point.

Optionally, the second sampling circuit includes a third resistor and a fourth resistor connected in series, a first terminal of the third resistor being connected to the anode of the bridge rectifier, a second terminal of the third resistor being connected to a first terminal of the fourth resistor at a third connection point, another terminal of the fourth resistor being connected to the cathode of the bridge rectifier before being grounded, the third connection point and a voltage-dividing point of the second sampling circuit being a same point, and the first terminal of the second sampling circuit and the first terminal of the third resistor being a same terminal.

Optionally, the LED smart control circuit further includes a filter circuit including a first inductance and a first capacitor. The first capacitor is connected in parallel with the external power supply, a first terminal of the first inductance is connected to a first terminal of the first capacitor, a second terminal of the first inductance is connected to a first alternating current (AC) input terminal of the bridge rectifier, and a second AC input terminal of the bridge rectifier is connected to a second terminal of the first capacitor.

Optionally, the LED smart control circuit further includes a second capacitor. A first terminal of the second capacitor is connected to the first terminal of the third resistor and the anode of the bridge rectifier at a fourth connection point, and a second terminal of the second capacitor is connected to another terminal of the fourth resistor and the cathode of the bridge rectifier at a fifth connection point.

Optionally, a first input terminal of the power grid detection unit is connected to the first terminal of the first capacitor, and a second input terminal of the power grid detection unit is connected to the second terminal of the first capacitor.

Optionally, the LED smart control circuit further includes an absorber circuit including a third capacitor, a fifth resistor, and a first diode. The third capacitor and the fifth resistor are connected in parallel, a first terminal of the third capacitor and a first terminal of the fifth resistor are each connected to the anode of the bridge rectifier at a sixth connection point, and a second terminal of the third capacitor and a second terminal of the fifth resistor are each connected to a cathode of the first diode at a seventh connection point.

Optionally, the transformer circuit includes a first transformer and a second diode, a first input terminal of the first transformer being connected to the first terminal of the third capacitor and a first terminal of the fifth resistor, a second input terminal of the first transformer being connected to an anode of the first diode at an eighth connection point, a first output terminal of the first transformer being connected to an anode of the second diode, a cathode of the second diode being connected to a first terminal of a fourth capacitor, and a second terminal of the fourth capacitor being connected to a second output terminal of the first transformer before being grounded.

Optionally, the LED smart control circuit further includes a third sampling circuit including a sixth resistor and a seventh resistor connected in series. A first terminal of the sixth resistor is connected to the cathode of the second diode, a second terminal of the sixth resistor is connected to a first terminal of the seventh resistor at a ninth connection point, and a second terminal of the seventh resistor is grounded.

Optionally, the LED smart control circuit further includes an AC-direct current (DC) controller, a first transistor, and a fifth capacitor. A power supply terminal of the AC-DC controller is connected to the anode of the bridge rectifier, an output voltage detection terminal of the AC-DC controller is connected to the ninth connection point, a drain electrode of a metal-oxide semiconductor (MOS) transistor in the AC-DC controller is connected to the eighth connection point, an output terminal of the AC-DC controller is connected to a collector of the first transistor, a base of the first transistor is connected to the microprocessor, an emitter of the first transistor is grounded, and a source electrode of the MOS transistor in the AC-DC controller is grounded. The output terminal of the AC-DC controller is connected to a first terminal of the fifth capacitor, and a second terminal of the fifth capacitor is connected to a ground terminal of the AC-DC controller before being grounded.

Optionally, the LED smart control circuit further includes a third diode and an eighth resistor, the third diode being arranged between the output terminal of the transformer circuit and the constant current controller. An anode of the third diode is connected to the cathode of the second diode, a cathode of the third diode is connected to a power supply input terminal of the constant current controller, a current detection terminal of the constant current controller is connected to a first terminal of the eighth resistor, and a second terminal of the eighth resistor is grounded.

Optionally, the LED smart control circuit further includes a fourth diode. A power supply input terminal of the battery charging controller is connected to each of the cathode of the second diode, an anode of the third diode, and a first terminal of the sixth resistor at a tenth connection point, a cathode of the third diode and a cathode of the fourth diode are each connected to an input terminal of the constant current controller at an eleventh connection point, an anode of the fourth diode is connected to each of the second connection point, a first terminal of the first resistor and the first terminal of the first sampling circuit being the same terminal.

Optionally, the LED smart control circuit further includes a voltage stabilizer. An input terminal of the voltage stabilizer is connected to the input terminal of the battery charging controller, and an output terminal of the voltage stabilizer is connected to the microprocessor.

Optionally, the LED smart control circuit further includes a temperature detector. The temperature detector is connected to the microprocessor to detect a temperature of the external rechargeable battery and send the temperature of the external rechargeable battery to the microprocessor, the microprocessor being configured to determine if the temperature of the external rechargeable battery is higher than or equal to a protection temperature. If the microprocessor determines the temperature of the external rechargeable battery is higher than or equal to a protection temperature, the microprocessor controls the constant current controller to reduce an output current of the constant current controller. When the temperature of the external rechargeable battery becomes normal, the microprocessor controls the constant current controller to output current with a normal value.

Another aspect or embodiment of the present disclosure includes an LED lighting device including LED light source components, a smart control circuit board, a rechargeable battery, a shell, and a lamp head. The smart control circuit board is integrated with the disclosed LED smart control circuit.

Optionally, the LED light source components include a substrate and a plurality of LEDs mounted on the substrate, a first terminal of an LED being connected to the output terminal of the constant current controller of the LED smart control circuit, a second terminal of the LED being connected to the current detection terminal of the constant current controller. The LED light source components are arranged on the shell, and the smart control circuit board and the rechargeable battery are arranged in the shell, an anode of the rechargeable battery being connected to a second connection point of the LED smart control circuit, the lamp head being connected to a bottom of the shell, the lamp head and an input terminal of the LED smart control circuit being connected in parallel.

Optionally, the LED lighting device further includes a lamp cover and a heat-dissipating cup. The LED light source components are disposed on the heat-dissipating cup, and the lamp cover covers the LED light source components and is connected to the heat-dissipating cup.

Optionally, the LED lighting device further includes a rubber holder and a rubber cover. The rechargeable battery is arranged between the rubber holder and the rubber cover, and the smart control circuit board is arranged above the rubber cover.

Optionally, the LED lighting device further includes a removable battery cover on one side of the shell for replacing the rechargeable battery, the rechargeable battery being a battery that can be repeatedly charged.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Reference will now be made in detail to exemplary embodiments of the invention, which are illustrated in the accompanying drawings. Hereinafter, embodiments consistent with the disclosure will be described with reference to drawings. Wherever possible, the same reference numbers will be used throughout the drawings to refer to the same or like parts. It is apparent that the described embodiments are some but not all of the embodiments of the present invention. Based on the disclosed embodiment, persons of ordinary skill in the art may derive other embodiments consistent with the present disclosure, all of which are within the scope of the present invention.

One aspect of the present disclosure provides an LED smart control circuit.

Figure 1:
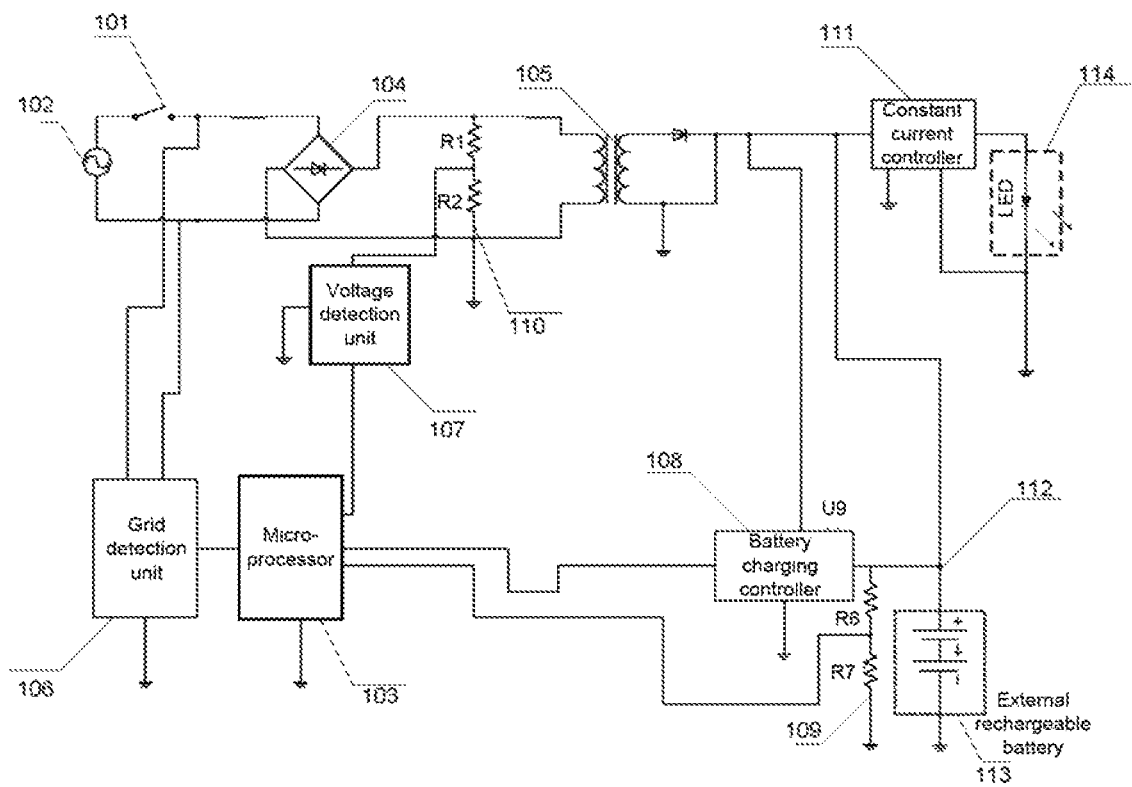
FIG. 1 illustrates the structure of an exemplary LED smart control circuit consistent with various embodiments of the present disclosure.

FIG. 1 illustrates the structure of an exemplary LED smart control circuit. As shown in FIG. 1, the LED smart control circuit provided by the present disclosure is configured to control LED light source components to emit light. The input terminal of the LED smart control circuit may be connected to an external power supply 102 through a control switch 101. The LED smart control circuit may include a microprocessor 103, a bridge rectifier 104, a transformer circuit 105, a power grid detection unit 106, a voltage detection unit 107, a battery charging controller 108, a first sampling circuit 109, a second sampling circuit 110, and a constant current controller 111.

The microprocessor 103 may be connected to a voltage-dividing point of the first sampling circuit 109, a control terminal of the battery charging controller 108, an output terminal of the voltage detection unit 107, and an output terminal of the power grid detection unit 106.

The power supply input terminal of the battery charging controller 108 may be connected to the output terminal of the transformer circuit 105. The output terminal of the battery charging controller 108 may be connected to the first terminal of the first sampling circuit 109 at the second connection point 112. The second connection point 112 may be configured to connect to the external rechargeable battery 113.

The input terminal of the voltage detection unit 107 may be connected to a voltage-dividing point of the second sampling circuit 110. The first terminal of the second sampling circuit 110 may be connected to the anode of the bridge rectifier 104. The second terminal of the second sampling circuit 110 may be connected to the cathode of the bridge rectifier 104.

The power grid detection unit 106 may be connected to the input terminal of the LED smart control circuit.

The input terminal of the constant current controller 111 may be connected to the output terminal of the transformer circuit 105. The output terminal and the current detection terminal of the constant current controller 111 may be connected to the LEDs 114 of the LED light source components.

The first sampling circuit 109 may be configured to sample the voltage of the external rechargeable battery 113. The microprocessor 103 may be configured to determine if the external rechargeable battery 113 is fully charged based on the voltage on the external rechargeable battery 113. If the microprocessor 103 determines the external rechargeable battery 113 is not fully charged, the microprocessor 103 may control the battery charging controller 108 to charge the external rechargeable battery 113.

The second sampling circuit 110 may be configured to sample a first signal rectified by the bridge rectifier 104. The voltage detection unit 107 may be configured to process the first signal to obtain a second signal. The microprocessor 103 may also be configured to determine if voltage/power is inputted into the LED smart control circuit based on the second signal when the control switch 101 is closed or connected. If the microprocessor 103 determines voltage is inputted into the LED smart control circuit, the microprocessor 103 may control the external power supply 102 to provide power for the LED light source components. If the microprocessor 103 determines no voltage is inputted into the LED smart control circuit, the microprocessor 103 may confirm the LED smart control circuit is connected to the external power supply 102 through the impedance change signals detected by the power grid detection unit 106. The microprocessor 103 may then control the external rechargeable battery 113 to provide power to the LED light source components.

The external power supply 102 may provide AC current as the input to the LED smart control circuit. When the control switch 101 is closed, the AC current provided by the external power supply 102 may be rectified by the bridge rectifier 104 and outputted as DC current. The DC current may be transformed to a low-voltage DC current through the transformer circuit 105. The low-voltage DC current may be processed by the constant current controller 111, and the constant current controller 111 may output a constant current to provide electricity/power for the LED light source components.

The first sampling circuit 109 may sample a voltage signal of the external rechargeable battery 113 and send the voltage signal to the microprocessor 103. The microprocessor 103 may determine if the external rechargeable battery 113 is fully charged based on the voltage signal of the external rechargeable battery 113. If the microprocessor 103 determines the external rechargeable battery 113 is not fully charged, the microprocessor 103 may control the battery charging controller 108 to charge the external rechargeable battery 113 through the low-voltage DC current outputted from the output terminal of the transformer circuit 105.

The second sampling circuit 110 may sample the first signal, i.e., the AC current rectified by the bridge rectifier 104, and send the first signal to the voltage detection unit 107. The voltage detection unit 107 may process the first signal through processes such as filtering and denoising, to obtain a second signal. The voltage detection unit 107 may send the second signal to the microprocessor 103. The microprocessor 103 may receive the second signal and determine if the second signal is a voltage signal. If the microprocessor 103 determines the second signal is a voltage signal, the microprocessor 103 may determine that voltage or power is inputted into the LED smart control circuit. The microprocessor 103 may thus control the external power supply 102 to provide power for the LED light source components. If the microprocessor 103 determines the second signal is not a voltage signal, the microprocessor 103 may determine that no voltage or power is inputted into the LED smart control circuit. The microprocessor 103 may detect the impedance change signal at the input terminal of the LED smart control circuit through the power grid detection unit 106. The power grid detection unit 106 may process the impedance change signal through processes such as filter and de-noising, and send the processed impedance change signal to the microprocessor 103. The microprocessor 103 may determine if the LED smart control circuit is connected to the external power supply 102 based on the impedance change signal. If the external power supply 102 is properly connected to the LED smart control circuit, the microprocessor 103 may determine if the external power supply 102 is malfunctioning and would not able to properly provide power for the LED smart control circuit. Thus, the microprocessor 103 may control the external rechargeable battery 113 to provide power for the LED light source components.

When no voltage is inputted into the LED smart control circuit and the external power supply 102 is not connected to the LED smart control circuit, the LED light source components may be indicated as being removed. The LED light source components would not emit light. The microprocessor 103 would not need to control the external power supply 102 nor the external rechargeable battery 113 to provide power for the LED light source components.

It should also be noted that, the off status of the control switch 101 generally indicates that the user of the LED smart control circuit does not need the LED light source components to emit light. That is, the processor 103 would not need to control the external power supply 102 nor the external rechargeable battery 113 to provide power for the LED light source components.

The disclosed LED smart control circuit may include a microprocessor, a bridge rectifier, a transformer circuit, a power grid detection unit, a voltage detection unit, a battery charging controller, a first sampling circuit, a second sampling circuit, and a constant current controller. The microprocessor may be connected to the voltage-dividing point of the first sampling circuit, the control terminal of the battery charging controller, the output terminal of the voltage detection unit, and the output terminal of the power grid detection unit. The output terminal of the battery charging controller may be connected to the external rechargeable battery. The input terminal of the constant current controller may be connected to the output terminal of the transformer circuit. The output terminal and the current detection terminal of the constant current controller may be connected to the LEDs of the LED lighting device. The microprocessor may sample the voltage signal of the external rechargeable battery through the first sampling circuit to determine if the external rechargeable battery is fully charged. If the microprocessor determines the external rechargeable battery is not fully charged, the microprocessor may control the battery charging controller to charge the external rechargeable battery.

When the control switch is closed, the microprocessor may determine if voltage is inputted into the LED smart control circuit based on the signal sent by the voltage detection unit. If the microprocessor determines that voltage is inputted into the LED smart control circuit, the microprocessor may control the external power supply to provide power for the LED light source components. If the microprocessor determines that no voltage is inputted into the LED smart control circuit, the microprocessor may determine whether the LED smart control circuit is connected to the external power supply through the impedance change signal detected by the power grid detection unit. In this case, the microprocessor may control the external rechargeable battery to provide power for the LED light source components. Thus, when the external power supply malfunctions and would not be able to provide power to the LED smart control circuit, the microprocessor may control the external rechargeable battery to provide power for the LED light source components. No additional lighting devices for emergency use are needed. The disclosed LED smart control circuit may make the users' life and work to be more convenient and comfortable, and provide smarter experience for the users. At the same time, waste of resources caused by un-using the lighting devices configured for emergency use when the LED lighting device is operating properly may be reduced or avoided.

Figure 2:
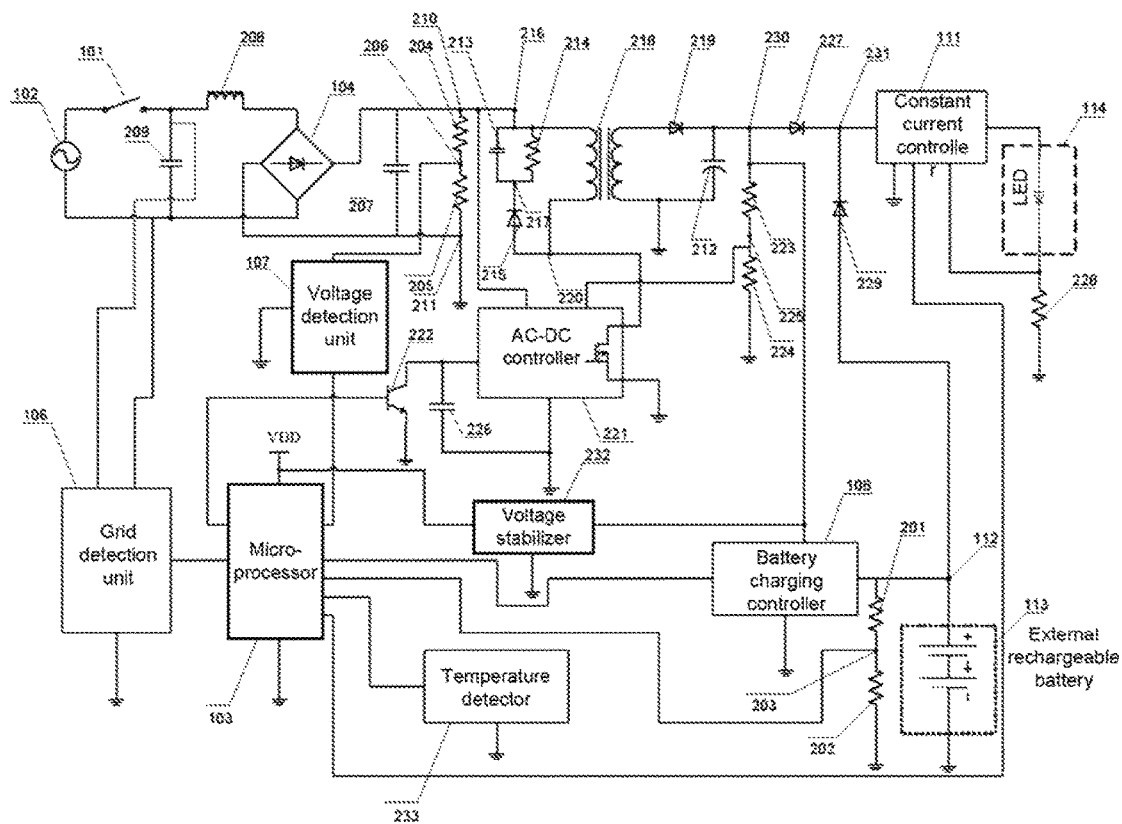
FIG. 2 illustrates the structure of another exemplary LED smart control circuit consistent with various embodiments of the present disclosure.

FIG. 2 illustrates the structure of another exemplary LED smart control circuit provided by the present disclosure.

As shown in FIG. 2, the first sampling circuit 109 may include a first resistor 201 and a second resistor 202 connected in series. The first terminal of the first resistor 201 may be connected to the output terminal of the battery charging controller 108. The second terminal of the first resistor 201 may be connected to the first terminal of the second resistor 202 at the first connection point 203. The other terminal of the second resistor 202 may be grounded. The first connection point 203 and the voltage-dividing point of the first sampling circuit 109 may be the same point.

The second sampling circuit 110 may include a third resistor 204 and a fourth resistor 205 connected in series. The first terminal of the third resistor 204 may be connected to the anode of the bridge rectifier 104. The second terminal of the third resistor 204 may be connected to the first terminal of the fourth resistor 205 at the third connection point 206. The other terminal of the fourth resistor 205 may be connected to the cathode of the bridge rectifier 104 before both being grounded. The third connection point 206 and the voltage-dividing point of the second sampling circuit 110 may be the same point. The first terminal of the second sampling circuit 110 and the first terminal of the third resistor 204 may be the same terminal.

In some embodiments, the LED smart control circuit may further include a filter circuit and a second capacitor 207.

Specifically, the filter circuit may include a first inductance 208 and a first capacitor 209. The first capacitor 209 may be connected in parallel with the external power supply 102. The first terminal of the first inductance 208 may be connected to the first terminal of the first capacitor 209. The second terminal of the first inductance 208 may be connected to the first AC input terminal of the bridge rectifier 104. The second AC input terminal of the bridge rectifier 104 may be connected to the second terminal of the first capacitor 209.

The first terminal of the second capacitor 207 may be connected to the first terminal of the third resistor 204 and the anode of the bridge rectifier 104 at the fourth connection point 210. The second terminal of the second capacitor 207 may be connected to the other terminal of the fourth resistor 205 and the cathode of the bridge rectifier 104 at the fifth connection point 211.

The first input terminal of the power grid detection unit 106 may be connected to the first terminal of the first capacitor 209. The second input terminal of the power grid detection unit 106 may be connected to the second terminal of the first capacitor 209.

To prevent the metal-oxide semiconductor (MOS) transistor in the AC-DC controller from undergoing a breakdown, in some embodiments, the LED smart control circuit may further include an absorber circuit. In certain embodiments, the LED smart control circuit may include a fourth capacitor 212.

Specifically, the absorber circuit may include a third capacitor 213, a fifth resistor 214, and a first diode 215. The third capacitor 213 and the fifth resistor 214 may be connected in parallel. The first terminal of the third capacitor 213 and the first terminal of the fifth resistor 214 may each be connected to the anode of the bridge rectifier 104 at the sixth connection point 216. The second terminal of the third capacitor 213 and the second terminal of the fifth resistor 214 may each be connected to the cathode of the first diode 215 at the seventh connection point 217.

The transformer circuit 105 may include a first transformer 218 and a second diode 219. The first input terminal of the first transformer 218 may be connected to the first terminal of the third capacitor 213 and the first terminal of the fifth resistor 214, respectively. The second input terminal of the first transformer 218 may be connected to the anode of the first diode 215 at the eighth connection point 220. The first output terminal of the first transformer 218 may be connected to the anode of the second diode 219. The cathode of the second diode 219 may be connected to the first terminal of the fourth capacitor 212. The second terminal of the fourth capacitor 212 may be connected to the second output terminal of the first transformer 218 before both being grounded.

To ensure the voltage outputted by the output terminal of the first transformer 218 meets the voltage requirement for the LED light source components, in some embodiments, the LED smart control circuit may further include a third sampling circuit and an AC-DC controller 221. A first transistor 222 may be configured to control the on and off states of the AC-DC controller 221.

The third sampling circuit may include a sixth resistor 223 and a seventh resistor 224 connected in series. The first terminal of the sixth resistor 223 may be connected to the cathode of the second diode 219. The second terminal of the sixth resistor 223 may be connected to the first terminal of the seventh resistor 224 at the ninth connection point 225. The second terminal of the seventh resistor 224 may be grounded.

The power supply terminal of the AC-DC controller 221 may be connected to the anode of the bridge rectifier 104. The output voltage detection terminal of the AC-DC controller 221 may be connected to the ninth connection point 225. The drain (D) electrode of the MOS transistor in the AC-DC controller 221 may be connected to the eighth connection point 220. The output terminal of the AC-DC controller 221 may be connected to the collector of a first transistor 222. The base of the first transistor 222 may be connected to the microprocessor 103. The emitter of the first transistor 222 may be grounded. The source (S) electrode of the MOS transistor in the AC-DC controller 221 may be grounded.

The output terminal of the AC-DC controller 221 may be connected to the first terminal of the fifth capacitor 226. The second terminal of the fifth capacitor 226 may be connected to the ground terminal of the AC-DC controller 221 before both being grounded.

The third sampling circuit may sample the voltage outputted by the first transformer 218 and send the sampled voltage to the AC-DC controller 221. If the voltage outputted by the output terminal of the first transformer 218 does not meet the requirement of operating voltage for the LED light source components, the AC-DC controller 221 may adjust or control the first transformer 218 to output a voltage that would meet the requirement of operating voltage for the LED lighting source components.

Further, in some embodiments, the LED smart control circuit may further include a third diode 227, an eighth resistor 228, and a fourth diode 229. The third diode 227 may be arranged between the output terminal of the transformer circuit 105 and the constant current controller 111.

Specifically, the anode of the third diode 227 may be connected to the cathode of the second diode 219. The cathode of the third diode 227 may be connected to the power supply input terminal of the constant current controller 111. The current detection terminal of the constant current controller 111 may be connected to the first terminal of the eighth resistor 228. The second terminal of the eighth resistor 228 may be grounded.

The power supply input terminal of the battery charging controller 108 may be connected to the cathode of the second diode 219, the anode of the third diode 227, and the first terminal of the sixth resistor 223, at the tenth connection point 230. The cathode of the third diode 227 and the cathode of the fourth diode 229 may each be connected to the input terminal of the constant current controller 111 at the eleventh connection point 231. The anode of the fourth diode 229 may be connected to the second connection point 112. The first terminal of the first resistor 201 and the first terminal of the first sampling circuit may be the same terminal.

To enable the battery charging controller 108 to better charge the external rechargeable battery 113, the design of the LED smart control circuit in the disclosed embodiments may be further optimized or improved.

One way to optimize the LED smart control circuit is to configure a voltage stabilizer 232 in the LED smart control circuit. The input terminal of the voltage stabilizer 232 may be connected to the power supply input terminal of the battery charging controller 108. The output terminal of the voltage stabilizer 232 may be connected to the microprocessor 103.

The arrangement of the voltage stabilizer 232 may ensure the battery charging controller 108 to stably output voltage for charging the external rechargeable battery 113.

Another way to optimize the LED smart control circuit is to configure a temperature detector 233 for the LED smart control circuit. The temperature detector 233 may be connected to the microprocessor 103 to detect the temperature of the external rechargeable battery 113 and send the temperature information to the microprocessor 103. The microprocessor 103 may also be configured to determine if the temperature of the external rechargeable battery 113 is higher than or equal to a protection temperature. If the microprocessor 103 determines that the temperature of the external rechargeable battery 113 is higher than or equal to a protection temperature, the microprocessor 103 may control the constant current controller 111 to reduce the output current. When the temperature of the external rechargeable battery 113 becomes normal, the microprocessor 103 may control the constant current controller 111 to output current with a normal value or normal output current.

The arrangement of the temperature detector 233 may prevent damages to the external rechargeable battery 113 caused by overheating during the charging processes. The service time of the external rechargeable battery 113 may be improved or extended.

Figure 3:
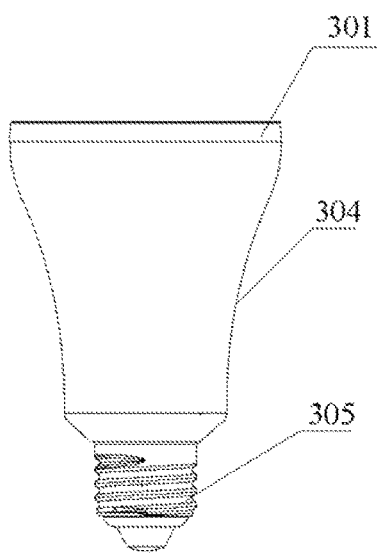
FIG. 3 illustrates the structure of an exemplary LED lighting device from a horizontal direction consistent with various embodiments of the present disclosure.
Figure 4:
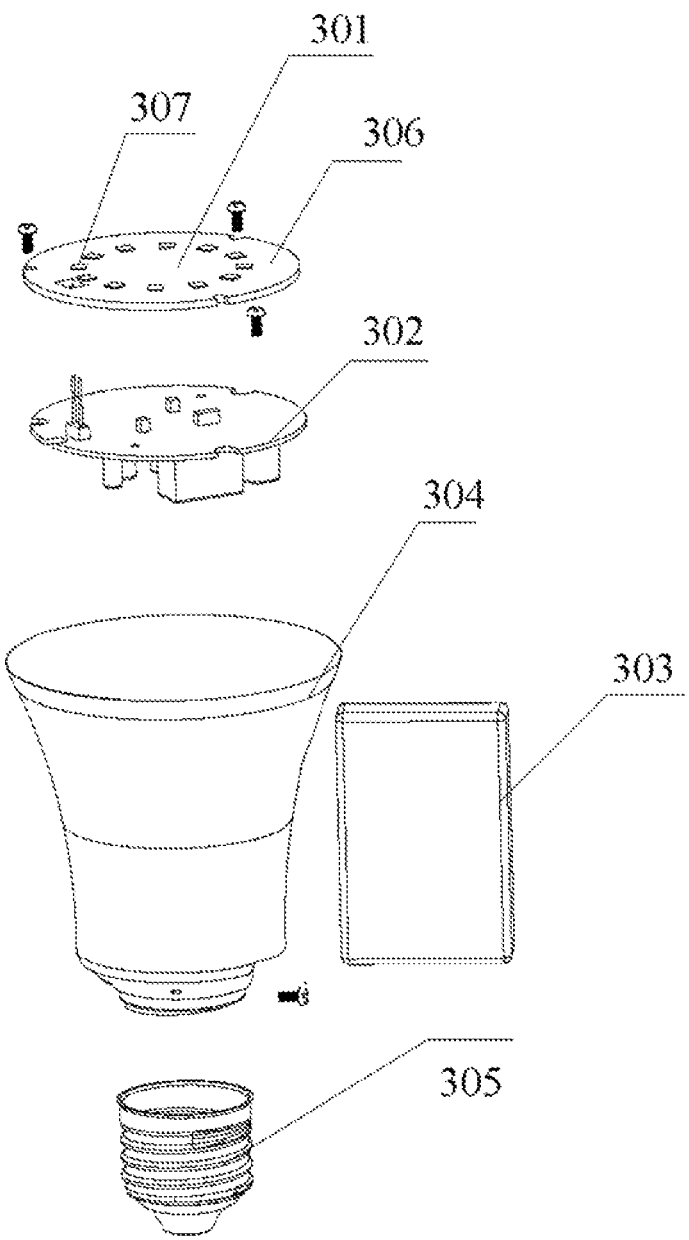
FIG. 4 illustrates a three-dimensional view of the LED lighting device illustrated in FIG. 3 consistent with various embodiments of the present disclosure.

Another aspect of the present disclosure provides an LED lighting device. FIG. 3 illustrates an exemplary LED lighting device provided by the present disclosure. FIG. 4 is a three-dimensional breakdown drawing of the LED lighting device shown in FIG. 3. As shown in FIGS. 3 and 4, the disclosed LED lighting device may include LED light source components 301, a smart control circuit board 302, a rechargeable battery 303, a shell 304, and a lamp head 305. The smart control circuit board 302 may be integrated with the disclosed LED smart control circuit.

The LED light source components 301 may include a substrate 306 and LEDs 307 mounted on the substrate 306. The first terminal of LEDs 307 may be connected to the output terminal of the constant current controller of the LED smart control circuit. The second terminal of LEDs 307 may be connected to the current detection terminal of the constant current controller.

The LED light source components 301 may be arranged on the shell 304. The smart control circuit board 302 and the rechargeable battery 303 (or external rechargeable battery 303) may be arranged in the shell 304. The anode of the rechargeable battery 303 may be connected to the second connection point of the LED smart control circuit. The lamp head 305 may be connected to the bottom of the shell 304. The lamp head 305 and the input terminal of the LED smart control circuit may be connected in parallel.

In operation, the lamp head 305 may be mounted on a lamp holder. The input terminal of the LED smart control circuit may be connected to an external power supply. The external power supply may provide power to the LED lighting device through the lamp head 305. The LED smart control circuit may control the rechargeable battery 303 to provide power for the LED lighting device when the external power supply malfunctions or otherwise does not work. The operation of the LED smart control circuit may be referred to previous embodiments and is not repeated herein.

The disclosed LED lighting device may include LED light source components, a smart control circuit board, a rechargeable battery, a shell, and a lamp head. The smart control circuit board may be integrated with the disclosed LED smart control circuit. The LED light source components may include a substrate and LEDs mounted on the substrate. The first terminal of LEDs is connected to the output terminal of the constant current controller in the LED smart control circuit. The second terminal of LEDs is connected to the current detection terminal of the constant current controller. The LED light source components may be arranged on the shell. The smart control circuit board and the rechargeable battery may be mounted in the shell. The anode of the rechargeable battery may be connected to the second connection point of the LED smart control circuit. The lamp head may be connected to the bottom of the shell and may be connected in parallel with the input terminal of the LED smart control circuit. By using the disclosed LED smart control circuit, the rechargeable battery may continue to provide power to the LED lighting device when the external power supply malfunctions and fails to provide power to the LED lighting device. No additional lighting devices for emergency use are needed. The life and work of the users are more convenient and comfortable, with smarter experience for users. At the same time, waste of resources, due to not using the lighting devices for emergency use when the LED lighting device is operating properly, may be reduced or avoided. The LEDs may have higher lighting efficiency, longer service time, and may be more energy-saving. The lighting of the LEDs may be longer under emergency conditions.

Figure 5:
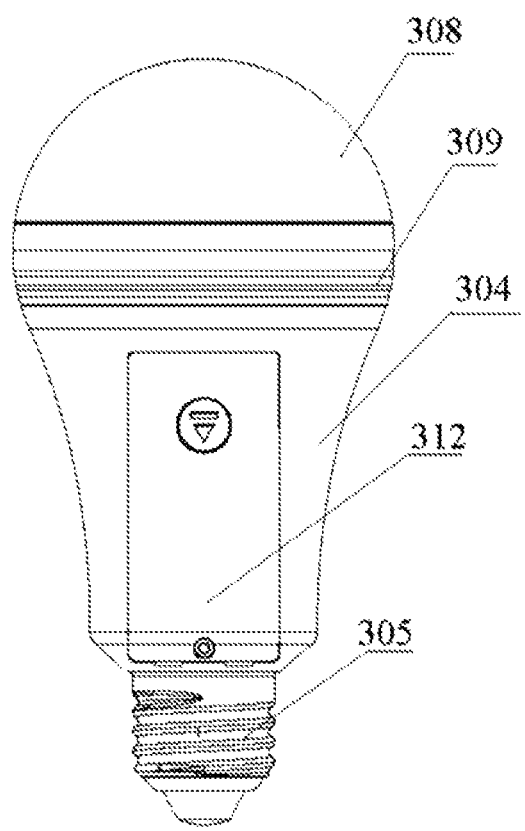
FIG. 5 illustrates the structure of another exemplary LED lighting device from a horizontal direction consistent with various embodiments of the present disclosure.
Figure 6:
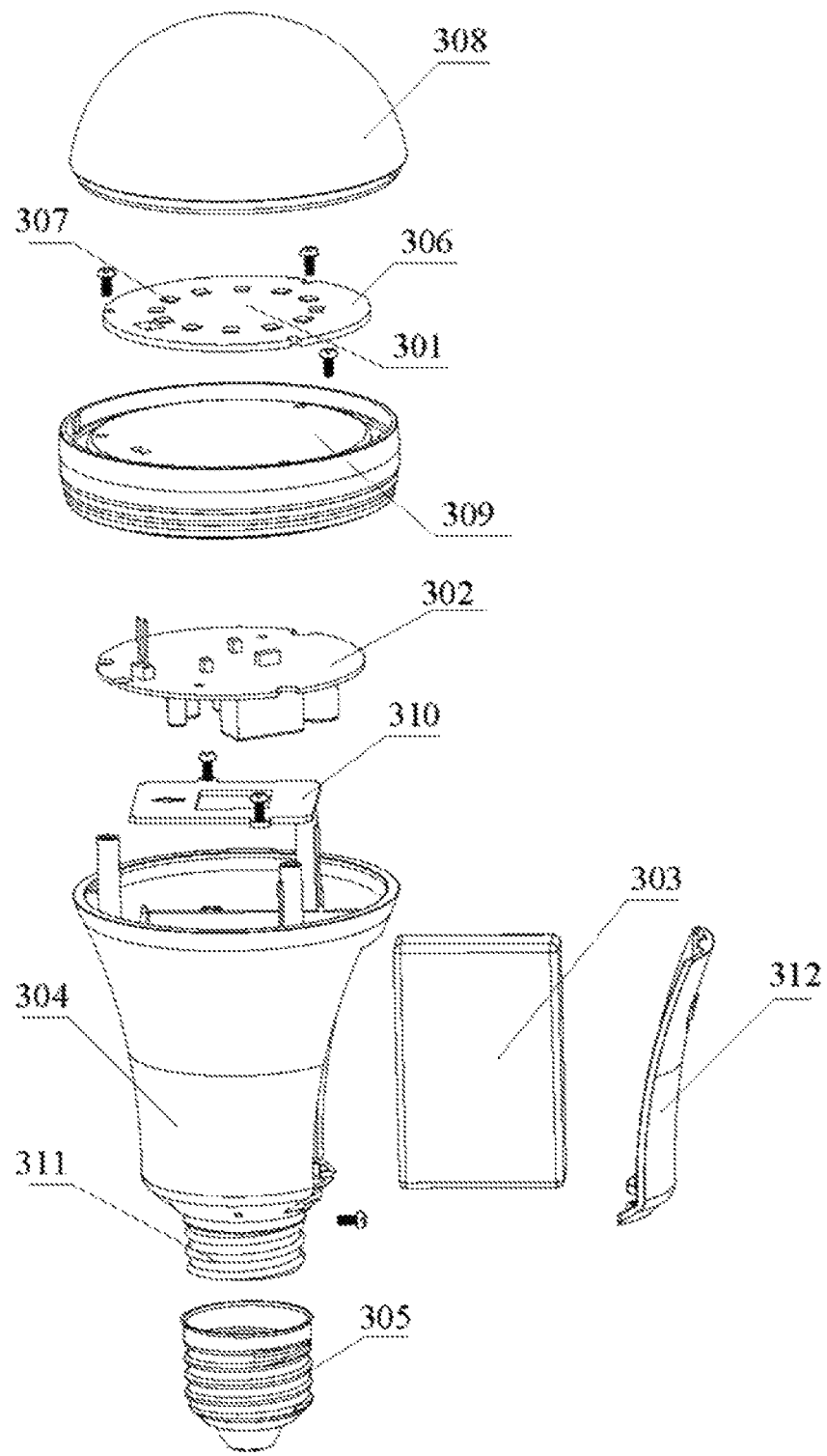
FIG. 6 illustrates an exploded three-dimensional view of the LED lighting device illustrated in FIG. 5 consistent with various embodiments of the present disclosure.

FIG. 5 illustrates another exemplary LED lighting device provided by the present disclosure. FIG. 6 is a breakdown drawing of the LED lighting device shown in FIG. 5. As shown in FIGS. 5 and 6, the LED lighting device may be optimized or improved based on the LED lighting device described in FIGS. 3 and 4. Specifically, the LED lighting device may include a lamp cover 308 and a heat-dissipating cup 309. The LED light source components 301 may be disposed on the heat-dissipating cup 309. The lamp cover 308 may cover the LED light source components 301 and may be connected to the heat-dissipating cup 309.

The arrangement of the lamp cover 308 may protect the LED light source components. In some embodiments, the lamp cover 308 may be a plastic-blister shell. Compared to a glass shell, a plastic-blister shell can more effectively protect the LED light source components from being affected by external forces. Thus, a lamp cover made of plastic-blister may provide higher level of safety in special/emergency conditions.

In some embodiments, the heat-dissipating cup 309 may be made of Al. An Al heat-dissipating cup may effectively reduce the heat generated when the LEDs are in operation. The service time of the LEDs may thus be longer.

To ensure the rechargeable battery can be used safely, in some embodiments, the shell 304 may further include a rubber holder 310 and a rubber cover 311. The rechargeable battery 303 may be arranged between the rubber holder 310 and the rubber cover 311. Accordingly, the smart control circuit board 302 may be arranged above the rubber cover 311.

In some embodiments, the shell 304 of the LED lighting device may further include a removable battery cover 312 on one side of the shell 304 for replacing the rechargeable battery 303. The rechargeable battery may be a battery that can be repeatedly charged, such as Li batteries and NiMH batteries.

The embodiments disclosed herein are exemplary only. Other applications, advantages, alternations, modifications, or equivalents to the disclosed embodiments are obvious to those skilled in the art and are intended to be encompassed within the scope of the present disclosure.

INDUSTRIAL APPLICABILITY AND ADVANTAGEOUS EFFECTS

Without limiting the scope of any claim and/or the specification, examples of industrial applicability and certain advantageous effects of the disclosed embodiments are listed for illustrative purposes. Various alternations, modifications, or equivalents to the technical solutions of the disclosed embodiments can be obvious to those skilled in the art and can be included in this disclosure.

The disclosed LED smart control circuit may include a microprocessor, a bridge rectifier, a transformer circuit, a power grid detection unit, a voltage detection unit, a battery charging controller, a first sampling circuit, a second sampling circuit, and/or a constant current controller. The microprocessor may be connected to the voltage-dividing point of the first sampling circuit, the control terminal of the battery charging controller, the output terminal of the voltage detection unit, and the output terminal of the power grid detection unit. The output terminal of the battery charging controller may be connected to the external rechargeable battery. The input terminal of the constant current controller may be connected to the output terminal of the transformer circuit. The output terminal and the current detection terminal of the constant current controller may be connected to the LEDs of the LED lighting device. The microprocessor may sample the voltage signal of the external rechargeable battery through the first sampling circuit to determine if the external rechargeable battery is fully charged. If the microprocessor determines the external rechargeable battery is not fully charged, the microprocessor may control the battery charging controller to charge the external rechargeable battery.

When the control switch is closed, the microprocessor may determine if voltage is inputted into the LED smart control circuit based on the signal sent by the voltage detection unit. If the microprocessor determines that voltage is inputted into the LED smart control circuit, the microprocessor may control the external power supply to provide power for the LED light source components. If the microprocessor determines that no voltage is inputted into the LED smart control circuit, the microprocessor may determine whether the LED smart control circuit is connected to the external power supply through the impedance change signal detected by the power grid detection unit. In this case, the microprocessor may control the external rechargeable battery to provide power for the LED light source components. Thus, when the external power supply malfunctions or is otherwise unable to provide power to the LED smart control circuit, the microprocessor may control the external rechargeable battery to provide power for the LED light source components. No additional lighting devices for emergency use are needed. The disclosed LED smart control circuit may make the users' life and work more convenient and comfortable, and provide smarter experience for the users. At the same time, waste of resources caused by not using the lighting devices for emergency use when the LED lighting device is operating properly may be reduced or avoided.

REFERENCE SIGN LIST

Control switch 101
External power supply 102
Microprocessor 103
Bridge rectifier 104
Transformer circuit 105
Power grid detection unit 106
Voltage detection unit 107
Battery charging controller 108
First sampling circuit 109
Second sampling circuit 110
Constant current controller 111
Second connection point 112
External rechargeable battery 113
LEDs 114
First resistor 201
Second resistor 202
First connection point 203
Third resistor 204
Fourth resistor 205
Third connection point 206
Second capacitor 207
First inductance 208
First capacitor 209
Fourth connection point 210
Fifth connection point 211
Fourth capacitor 212
Third capacitor 213
Fifth resistor 214
First diode 215
Sixth connection point 216
Seventh connection point 217
First transformer 218
Second diode 219
Eighth connection point 220
AC-DC controller 221
First transistor 222
Sixth resistor 223
Seventh resistor 224
Ninth connection point 225
Fifth capacitor 226
Third diode 227
Eighth resistor 228
Fourth diode 229
Tenth connection point 230
Eleventh connection point 231
Voltage stabilizer 232
Temperature detector 233
LED light source components 301
Smart control circuit board 302
Rechargeable battery 303
Shell 304
Lamp head 305
Substrate 306
LED 307
Lamp cover 308
Heat-dissipating cup 309
Rubber holder 310
Rubber cover 311
Removable battery cover 312

What is claimed is:

1. A light-emitting diode (LED) smart control circuit to control LED light source components to emit light, comprising:

a microprocessor, a bridge rectifier, a transformer, a power grid detector, a voltage detector, a battery charging controller, a first sampling circuit, a second sampling circuit, a constant current controller, and an external rechargeable battery, wherein:

the microprocessor is connected to each of a voltage-dividing point of the first sampling circuit, a control terminal of the battery charging controller, an output terminal of the voltage detector, and an output terminal of the power grid detector;

a power supply input terminal of the battery charging controller is connected to an output terminal of the transformer, and an output terminal of the battery charging controller is connected to a first terminal of the first sampling circuit at a first connection point, the first connection point connecting with the external rechargeable battery;

an input terminal of the voltage detector is connected to each of a voltage-dividing point of the second sampling circuit, a first terminal of the second sampling circuit is connected to an anode of the bridge rectifier, and a second terminal of the second sampling circuit is connected to a cathode of the bridge rectifier;

the power grid detector is connected to the input terminal of the LED smart control circuit; and an input terminal of the constant current controller is connected to an output terminal of the transformer, the output terminal and a current detection terminal of the constant current controller being connected to the LED light source components;

wherein:

the first sampling circuit is configured to sample a voltage of the external rechargeable battery, and the microprocessor is configured to determine when the external rechargeable battery is fully charged based on the voltage of the external rechargeable battery, wherein when the microprocessor determines the external rechargeable battery is not fully charged, the microprocessor controls the battery charging controller to charge the external rechargeable battery; and the second sampling circuit is configured to sample a first signal rectified by the bridge rectifier, the voltage detector is configured to process the first signal to obtain a second signal, and the microprocessor is configured to determine when a voltage is inputted into the LED smart control circuit based on the second signal when the control switch is closed, wherein when the microprocessor determines a voltage is inputted into the LED smart control circuit, the microprocessor controls an external power supply to provide power for the LED light source components, and when the microprocessor determines no voltage is inputted into the LED smart control circuit, the microprocessor confirms the LED smart control circuit is connected to the external power supply through an impedance change signal detected by the power grid detector and controls the external rechargeable battery to provide power for the LED light source components;

the first sampling circuit includes a first resistor and a second resistor connected in series, a first terminal of the first resistor being connected to the output terminal of the battery charging controller, a second terminal of the first resistor being connected to the a terminal of the second resistor at a second connection point, another terminal of the second resistor being grounded, and the second connection point and a voltage-dividing point of the first sampling circuit being a same point;

the second sampling circuit includes a third resistor and a fourth resistor connected in series, a first terminal of the third resistor being connected to the anode of the bridge rectifier, a second terminal of the third resistor being connected to a first terminal of the fourth resistor at a third connection point, another terminal of the fourth resistor being connected to the cathode of the bridge rectifier before being grounded, the third connection point and a voltage-dividing point of the second sampling circuit being a same point, and the first terminal of the second sampling circuit and the first terminal of the third resistor being a same terminal.

2. The LED smart control circuit according to claim 1, further including a filter including a first inductor and a first capacitor, wherein:

the first capacitor is connected in parallel with the external power supply, a first terminal of the first inductor is connected to a first terminal of the first capacitor, a second terminal of the first inductor is connected to a first alternating current (AC) input terminal of the bridge rectifier, and a second AC input terminal of the bridge rectifier is connected to a second terminal of the first capacitor.

3. The LED smart control circuit according to claim 2, further including a second capacitor, wherein a first terminal of the second capacitor is connected to the first terminal of the third resistor and the anode of the bridge rectifier at a fourth connection point, and a second terminal of the second capacitor is connected to another terminal of the fourth resistor and the cathode of the bridge rectifier at a fifth connection point.

4. The LED smart control circuit according to claim 1, wherein a first input terminal of the power grid detector is connected to the first terminal of the first capacitor, and a second input terminal of the power grid detector is connected to the second terminal of the first capacitor.

5. The LED smart control circuit according to claim 1, further including an absorber circuit including a third capacitor, a fifth resistor, and a first diode, wherein:

the third capacitor and the fifth resistor are connected in parallel, a first terminal of the third capacitor and a first terminal of the fifth resistor are each connected to the anode of the bridge rectifier at a sixth connection point, and a second terminal of the third capacitor and a second terminal of the fifth resistor are each connected to a cathode of the first diode at a seventh connection point.

6. The LED smart control circuit according to claim 5, wherein:

the transformer includes a first transformer and a second diode, a first input terminal of the first transformer being connected to the first terminal of the third capacitor and a first terminal of the fifth resistor, a second input terminal of the first transformer being connected to an anode of the first diode at an eighth connection point, a first output terminal of the first transformer being connected to an anode of the second diode, a cathode of the second diode being connected to a first terminal of a fourth capacitor, and a second terminal of the fourth capacitor being connected to a second output terminal of the first transformer before being grounded.

7. The LED smart control circuit according to claim 6, further including a third sampling circuit including a sixth resistor and a seventh resistor connected in series, wherein:

a first terminal of the sixth resistor is connected to the cathode of the second diode, a second terminal of the sixth resistor is connected to a first terminal of the seventh resistor at a ninth connection point, and a second terminal of the seventh resistor is grounded.

8. The LED smart control circuit according to claim 7, further including an AC-direct current (DC) controller, a first transistor, and a fifth capacitor, wherein:

a power supply terminal of the AC-DC controller is connected to the anode of the bridge rectifier, an output voltage detection terminal of the AC-DC controller is connected to the ninth connection point, a drain electrode of a metal-oxide semiconductor (MOS) transistor in the AC-DC controller is connected to the eighth connection point, an output terminal of the AC-DC controller is connected to a collector of the first transistor, a base of the first transistor is connected to the microprocessor, an emitter of the first transistor is grounded, and a source electrode of the MOS transistor in the AC-DC controller is grounded; and the output terminal of the AC-DC controller is connected to a first terminal of the fifth capacitor, and a second terminal of the fifth capacitor is connected to a ground terminal of the AC-DC controller before being grounded.

9. The LED smart control circuit according to claim 6, further including a third diode and an eighth resistor, the third diode being arranged between the output terminal of the transformer and the constant current controller, wherein:
an anode of the third diode is connected to the cathode of the second diode, a cathode of the third diode is connected to a power supply input terminal of the constant current controller, a current detection terminal of the constant current controller is connected to a first terminal of the eighth resistor, and a second terminal of the eighth resistor is grounded.

10. The LED smart control circuit according to claim 9, further including a fourth diode, wherein:
a power supply input terminal of the battery charging controller is connected to each of the cathode of the second diode, an anode of the third diode, and a first terminal of the sixth resistor at a tenth connection point, a cathode of the third diode and a cathode of the fourth diode are each connected to an input terminal of the constant current controller at an eleventh connection point, an anode of the fourth diode is connected to the first connection point, a first terminal of the first resistor and the first terminal of the first sampling circuit being the same terminal.

11. The LED smart control circuit according to claim 1, further including a voltage stabilizer, wherein an input terminal of the voltage stabilizer is connected to the input terminal of the battery charging controller, and an output terminal of the voltage stabilizer is connected to the microprocessor.

12. The smart LED lighting system according to claim 1, further including a temperature detector, wherein:
the temperature detector is connected to the microprocessor to detect a temperature of the external rechargeable battery and send the temperature of the external rechargeable battery to the microprocessor, the microprocessor being configured to determine when the temperature of the external rechargeable battery is higher than or equal to a protection temperature, wherein:
when the microprocessor determines the temperature of the external rechargeable battery is higher than or equal to a protection temperature, the microprocessor controls the constant current controller to reduce an output current of the constant current controller, and when the temperature of the external rechargeable battery becomes normal, the microprocessor controls the constant current controller to output current with a normal value.

* * * * *